UNITED STATES PATENT OFFICE.

RAYMOND VIDAL, OF PARIS, FRANCE.

BLACK DYE.

SPECIFICATION forming part of Letters Patent No. 523,138, dated July 17, 1894.

Application filed October 31, 1893. Serial No. 489,589. (Specimens.)

*To all whom it may concern:*

Be it known that I, RAYMOND VIDAL, a citizen of the Republic of France, residing in Paris, France, have invented certain new and useful Improvements in Processes of Producing Black Dye-Stuffs Dyeing without Mordants, of which the following is a specification.

This invention has reference to an improved process of producing greenish-black, bluish-black and black dyestuffs which can be used for dyeing textile fabrics without the use of mordants; and the invention consists of the process of producing these dyestuffs by subjecting ortho- or paradioxy-benzenes to the action of heat in the presence of sulfur and ammonia or other substances which are capable of liberating ammonia during the reaction.

In carrying out my improved process a series of dyestuffs is obtained by which the unmordanted fibers are directly dyed in a greenish-black, bluish-black or black color by the reaction on one of the ortho- or para dioxy-benzenes of sulphur in the presence of ammonia or a fatty amine. The ammonia or the fatty amine may be employed in its free state or in such combinations which are susceptible of producing the desired colors in the course of the reaction.

The process can be carried out either in open or closed vessels at temperatures, varying between 130° and 210° centigrade. The shade of the dyestuffs obtained varies according to the nature of the substances and temperature employed.

The following proportions have given good results: twenty pounds of quinone, ten pounds of sulfur, eight pounds of ammonia chlorid, twelve pounds of caustic soda. They are heated in a closed vessel for five hours at a temperature of 160° to 210° centigrade. At the end of this time, the mass is permitted to cool; it is then pulverized and forms a dyestuff which can be used for dyeing without further purification.

When an aqueous solution of these crude dye-stuffs is subjected to the more or less extended action of sulfuric acid, various shades of colors may be obtained. The addition of sulfuric acid liberates sulfureted hydrogen while simultaneously the greater portion of the coloring matter is precipitated from the solution. The precipitated coloring matter is soluble in caustic soda and quickly soluble with a greenish black shade in alkaline sulfites, in which form vegetable fibers are dyed in a grayish-blue, bluish-black and black color. On the other hand, the uncolored acid liquor, from which the precipitate is separated by filtration, dyes after neutralization by caustic soda either by the oxygen of the air or by oxidizing agents and imparts an intensely violet-blue color. This coloring matter, which is obtained only in small quantities, dyes the woolen fiber in the neutral bath violet-blue, in the acid bath "orseille red."

When quinone is replaced by hydro-quinone, the reaction takes place in an analogous manner. Other dyestuffs are obtained when in the example before given the quinone is replaced by toluquinone or pyrocatechin or the ammonia by a fatty amine, such as the mono- or di-methylamin.

The various dyestuffs thus obtained may be used for dyeing either in their crude form, or in their purified form by subjecting them to the before described treatment with sulfuric acid, but in any case it is necessary for being used in dyeing, that a suitable quantity of sodium sulfite be added, of which, in practice, from two to three times the weight of the coloring matter may be used.

Having thus described my invention, I claim as new and desire to secure by Letters Patent—

The process herein described of producing greenish-black, bluish-black and black dyestuffs capable of dyeing the fiber without mordants, which consists in heating ortho- or paradioxy-benzene, such as quinone, toluquinone, or pyrocatechin in the presence of sulfur and of substances which are capable of generating ammonia during the reaction, substantially as set forth.

In testimony whereof I have signed this specification in the presence of two subscribing witnesses.

RAYMOND VIDAL.

Witnesses:
   CLYDE SHROPSHIRE,
   EDWARD BARBARY.